Patented Oct. 14, 1941

2,258,833

UNITED STATES PATENT OFFICE 2,258,833

INSECTICIDAL OIL SPRAY

Elmer W. Adams, Hammond, Ind., and Thomas E. Sharp, Chicago, Ill., assignors to Standard Oil Company, Chicago, Ill., a corporation of Indiana No Drawing. Application August 26, 1939, Serial No. 292,070

6 Claims. (Cl. 167—28)

This invention relates to insecticidal oil sprays and it pertains more particularly to an improvement in oil sprays containing hydroxy esters of high molecular weight organic acids in combination with toxics such as nicotine, naphthenic acid, nicotine naphthenate, etc. Such sprays are of the so-called "soluble" type wherein the toxic and the emulsifier are dissolved in the oil, the spray being emulsified in water in the field and applied to deciduous trees for combating such insect pests as codling moth and to citrus trees for combating such insect pests as scale, mealy bugs, etc.

Lead residues remaining on fruit after the application of lead arsenate require thorough washing of the fruit and even then there is considerable danger to public health because lead is a cumulative poison. For many years therefore, entomologists and manufacturers of tree sprays have endeavored to find a satisfactory and effective tree spray which avoids the necessity of using lead. The nearest approach to such spray is that covered by U. S. Patent 2,155,946 which describes a soluble oil containing oil soluble nicotine naphthenate. Although this spray has proved to be very effective it has been found that on storage a black tarry deposit tends to separate out from the soluble oil which renders the oil unsightly when marketed in glass bottles and which tends to coat and clog the sprayers used for commercial application. The same problem of settling out of resinous material has confronted manufacturers of nicotine containing soluble oils for many years. The object of our invention is to provide a method and means for preventing this settling out of resinous or black tarry deposits from soluble oils, particularly those containing glyceryl or glycol oleates and nicotine or nicotine compounds.

After testing innumerable additives, solvents or miscibility agents we have discovered that the separation of this resinous or tarry deposit may be prevented by the addition to the spray oil of about .1 to 1%, and preferably about .25 to .5% of mahogany soaps. An important feature of the invention is the use of such types and quantities of mahogany soap that the emulsifying properties of the glyceryl oleate are not materially altered. Laboratory tests have shown that soluble oil sprays containing glyceryl oleate, nicotine and mahogany soap have remained clear and bright after many months' storage while the same spray in the absence of mahogany soap becomes turbid and contaminated by a resinous or tarry deposit after only a few days' storage. If the original deposit is removed by settling or centrifuging it is found that further deposit occurs on further standing. When the critically small quantities of mahogany soap are employed no sedimentation or centrifuging is necessary and the oil remains clear and bright after storage for long periods under severe storage conditions. Field tests have shown that the use of mahogany soaps in these critically small amounts does not adversely effect emulsification properties and that it appears to actually increase the deposits and the effectiveness of the oil spray.

Mahogany soap is the outstanding agent which we have found among a large number of compounds tested for preventing turbidity and resinous tarry or gummy deposits in spray oils. We have found, however, that lecithin when used in the same proportions as mahogany soap acts as a stabilizer for preventing the formation of undesirable deposits. Our invention is therefore not limited to the use of mahogany soap but broadly includes the use of stabilizers for the prevention of undesirable deposits in the particular type of tree sprays hereinafter described.

As above stated, this invention is an improvement on that type of soluble oil which employs glyceryl oleate, glycol oleate or equivalent hydroxy esters of a high molecular weight organic acid as an emulsifier, and which also contains a supposedly oil soluble toxic material such as naphthenic acid, nicotine, nicotine naphthenate, etc. Perhaps the simplest example of such a soluble oil is as follows:

| | Per cent |
|---|---|
| White oil (about 60 vis. at 100° F. and about 90% unsulfonatable) | 93 |
| Glyceryl oleate | 2 |
| Oil soluble nicotine compound | 5 |

Another example is as follows:

| | Per cent |
|---|---|
| White oil (about 60 vis. at 100° F. and about 90% unsulfonatable) | 93.25 |
| Glyceryl oleate | 1 |
| Aluminum naphthenate | .75 |
| Nicotine oleate | 5 |

The outstanding and preferred example of such soluble oil is as follows:

| | Per cent |
|---|---|
| White oil (80 vis. at 100° F. and about 95% unsulfonatable) | 91.4 |
| Glyceryl oleate | 1.5 |
| Aluminum oleate | 2 |
| Nicotine | 2 |
| Naphthenic acid | 3.1 |

It should be understood that in each and all of the above formulae or in similar formulae which may be used in practicing the invention the oil is preferably a mineral oil from about 40 to 100 seconds Saybolt viscosity at 100° F., which has been refined by the use of acids or solvents to such an extent that it is noninjurious to plant foliage. We prefer to use oils which have an unsulfonatable residue upwards of 85 and preferably of about 90 to 95, i. e. the so-called white oils or technical white oils. For some purposes, however, particularly for deciduous applications, ordinary paraffin distillates and oils of lower than 85% unsulfonatable residues may be used.

Our invention pertains to those soluble oils wherein the emulsifier is a hydroxy ester of a high molecular weight organic acid. The outstanding examples of such emulsifiers are glyceryl oleate, preferably a mixture of glyceryl mono- and dioleates. Glycol mono-oleate and diglycol mono-oleate have likewise been found to be highly satisfactory. Glyceryl naphthenate and hydroxy glyceryl or glycol esters of sulfonated oils may also be used.

While the emulsifier may consist solely of the hydroxy ester such as glyceryl oleate we prefer to employ about ½ to 2½%, preferably about 2% of an aluminum soap such as aluminum oleate or aluminum naphthenate. Other aluminum soaps, and particularly soaps of sulfonated oils or of sulfonated naphthenic acids may likewise be used.

The invention is particularly applicable to such toxics as nicotine, naphthenic acid and nicotine naphthenate, but it is, of course, applicable to the use of other toxics which when incorporated in the soluble oil tend to cause turbidity or the settling out of resinous or tarry deposits. The nicotine naphthenate is preferably prepared as described in U. S. Patent 2,155,946.

In accordance with our invention we add to soluble oil sprays of the type hereinabove described a critically small amount of a stabilizer which is preferably mahogany soap. As above stated, lecithin or other stabilizers may be used but we have found, both in the laboratory and in field tests that mahogany soap gives outstanding results. We have found that these stabilizers must be added in amounts of at least .1% and preferably of at least .25% to effect the stabilizing action. About .5% of the stabilizer is usually sufficient to insure stability and to prevent turbidity and the formation of undesirable deposits. In all cases the amount of the stabilizing agent must be below 1% because larger amounts, particularly of the mahogany soap, tend to alter the emulsification characteristics of the spray oil. Mahogany soap itself, particularly the purified mahogany soap, is a well-known emulsifier and it has been proposed and used with some success in soluble oil sprays. For our purpose we use an insufficient amount of mahogany soap to effect the emulsification or to materially alter the emulsifying properties of glyceryl oleate or glyceryl oleate-aluminum oleate combinations.

The mahogany soap may in general be prepared as described in U. S. Patent 1,286,179. Mineral oils are treated with a number of dumps of concentrated or fuming sulfuric acid and the resulting sludge is separated from the oil after each dump. The so-called green acids are separated with the sludge and withdrawn, and the preferentially oil-soluble sulfonic acids remain dissolved in the oil. These acids are neutralized to form soaps and the soaps are extracted with 50% to 80% aqueous alcoholic solutions. The soaps so extracted are called mahogany soaps and they contain considerable amounts of oil as well as certain amounts of salts such as sodium sulfate. These mahogany soaps differ in quality with different oils undergoing treatment and with different acid concentrations, different dumps, etc.

The mahogany soaps which are extracted with 50% aqueous alcoholic solutions are generally referred to simply as mahogany soaps. These soaps may be further purified by extraction with more concentrated alcohol for the removal of considerable impurities and further fractionation of the mahogany soap itself; the purified mahogany soap remaining dissolved in the 80% alcoholic solution is a more potent emulsifier than the mahogany soap removed by the 50% alcoholic solution.

When concentrated alcohol, i. e. about 80%, is used for the extraction there is sometimes a separation of three liquid layers, the upper layer being the most active emulsifier,—the so-called grade AA mahogany soap. The ordinary mahogany soap of good emulsifying properties is called grade A mahogany soap, and that with poor emulsifying properties is called grade B, which usually contains more salts and "impurities" than the grade A soaps.

In the practice of our invention we may use any of these mahogany soaps but lesser amounts of the grade A or grade AA soaps can be employed if we are to avoid upsetting the emulsification properties of the glyceryl oleate. The grade B mahogany soap appears to give excellent results and since it is less expensive than the more highly purified grades it is a preferred material for use in practicing our invention.

A preferred embodiment of our invention therefore is illustrated by the following formula:

|  | Per cent |
|---|---|
| White oil (80 seconds vis. at 100° F. and about 90 to 95% unsulfonatable residue) | 91 |
| Glyceryl oleate | 1.5 |
| Aluminum oleate | 2 |
| Nicotine naphthenate plus naphthenic acid | 5.1 |
| Mahogany soap | .4 |

While the mahogany soap in the critical amounts hereinabove described is an excellent stabilizer for the glyceryl oleate-nicotine spray oil, and has been found to markedly improve such spray oil in field tests, it should be understood that we may use lecithin, or other stabilizers, particularly when it is desired to utilize the toxicity of such stabilizers in addition to their stabilizing effect against turbidity and against the formation of resinous or tarry deposits.

Also it should be understood that we contemplate using other preferentially oil-soluble sulfonic soaps in place of mahogany soap, i. e. sulfonic soaps produced from vegetable or animal oils as well as sulfonic soaps produced from mineral oils.

We claim:

1. A tree spray oil having approximately the following compositions:

|  | Per cent |
|---|---|
| Refined mineral oil | 92.5 |
| Partially esterified glycol or glyceryl oleate | 2 |
| Oil soluble nicotine compound | 5 |
| Mahogany soap | .5 |

2. An improved tree spray oil having approximately the following formula:

| | Per cent |
|---|---|
| Refined mineral oil | 91 |
| Partially esterified glyceryl oleate | 1.5 |
| Aluminum oleate | 2 |
| Nicotine | 2 |
| Naphthenic acid | 3.1 |
| Mahogany soap | .4 |

3. The method of preventing the separation of insoluble deposits from tree spray oils containing an hydroxy ester of high molecular weight organic acids and polyhydroxy alcohols of the class consisting of glycol and glycerol and containing an oil soluble toxic of the class consisting of nicotine and oil soluble nicotine compounds, which method comprises adding a mahogany soap to such oil sprays in amounts greater than 0.1% and less than 1.0%.

4. The method of stabilizing a spray oil comprising a mineral oil, an emulsifier of the class consisting of partially esterified glyceryl and glycol oleates, and a toxic of the class consisting of nicotine and oil soluble nicotine compounds, which method comprises adding to said spray oil at least 0.1% but not more than 1.0% of an oil soluble mineral oil sulfonic acid soap.

5. The method of preventing turbidity and the separation of insoluble resinous or tarry deposits from a tree spray oil comprising a mineral oil, an emulsifier of the class consisting of partially esterified glyceryl and glycol oleates and a toxic of the class consisting of nicotine and oil soluble nicotine compounds, which method comprises adding to said spray about 0.25 to 0.5% of a mahogany soap.

6. An improved tree spray oil which comprises about 90 to 95% of a refined mineral oil of about 40 to 100 seconds Saybolt viscosity at 100° F. and about 85 to 95% unsulfonatable residue, about 0.5 to 2.5% of an emulsifier of the class consisting of partially esterified glyceryl and glycol oleates, about 2 to 5% of a toxic of the class consisting of nicotine and oil soluble nicotine compounds, and about 0.1 to 1.0% of an oil soluble petroleum sulfonic acid soap.

ELMER W. ADAMS.
THOMAS E. SHARP.